(12) United States Patent
Wenning et al.

(10) Patent No.: US 6,488,172 B1
(45) Date of Patent: Dec. 3, 2002

(54) THERMALLY INSULATING HOUSING

(75) Inventors: Udo Wenning, Giengen (DE); Jürgen Hirath, Heidenheim (DE); Hans-Frieder Eberhardt, Giengen (DE); Ulrich Wolf, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 175 days.

(21) Appl. No.: 09/174,041

(22) Filed: Oct. 16, 1998

(30) Foreign Application Priority Data

Oct. 16, 1997 (DE) .......................... 197 45 826

(51) Int. Cl.[7] .......................... F25D 11/00; F25D 23/06
(52) U.S. Cl. .............................. 220/592.02; 220/592.1; 220/592.25; 220/592.27
(58) Field of Search .................. 220/592.02, 592.09, 220/592.1, 592.2, 592.27, 610, 612, 625

(56) References Cited

U.S. PATENT DOCUMENTS

| ,984,873 | A | * | 2/1911 | Whittier | 220/592.02 X |
|---|---|---|---|---|---|
| 1,543,349 | A | * | 6/1925 | Walker | 220/592.02 |
| 2,002,366 | A | * | 5/1935 | Eto | 220/614 |
| 2,039,255 | A | * | 4/1936 | Marland | 220/612 |
| 2,275,365 | A | * | 3/1942 | Hintze | 220/592.09 X |
| 2,319,487 | A | * | 5/1943 | Baldwin, Jr. | 220/612 |
| 2,699,583 | A | * | 1/1955 | Kurtz | 220/592.09 X |
| 2,727,363 | A | * | 12/1955 | Fenner | 62/289 |
| 3,351,189 | A | * | 11/1967 | Hoth | 220/592.02 X |
| 3,933,398 | A | * | 1/1976 | Haag | 220/592.09 X |
| 4,563,559 | A | * | 1/1986 | Enami | 220/619 |
| 4,573,603 | A | * | 3/1986 | Starling et al. | 220/605 |
| 5,374,118 | A | * | 12/1994 | Kruck et al. | 220/592.1 |
| 5,586,680 | A | * | 12/1996 | Dellby et al. | 220/592.06 |

* cited by examiner

*Primary Examiner*—Lee Young
*Assistant Examiner*—Niki M. Eloshway
(74) *Attorney, Agent, or Firm*—Laurence A. Greenberg; Werner H. Stemer; Ralph E. Locher

(57) ABSTRACT

A thermally insulating housing has one housing shell inside another. The two housing shells are at least largely vacuum-tight, they are spaced apart from one another by a thermal insulation layer, and they are connected to one another in a vacuum-tight fashion. A useful space inside the thermally insulating housing is accessible through a loading opening. The housing shells are tubular elements which are closed in a vacuum-tight fashion at one of their openings with a cover which is at least very largely vacuum-tight. The remaining opening serves as the loading opening of the housing.

15 Claims, 2 Drawing Sheets

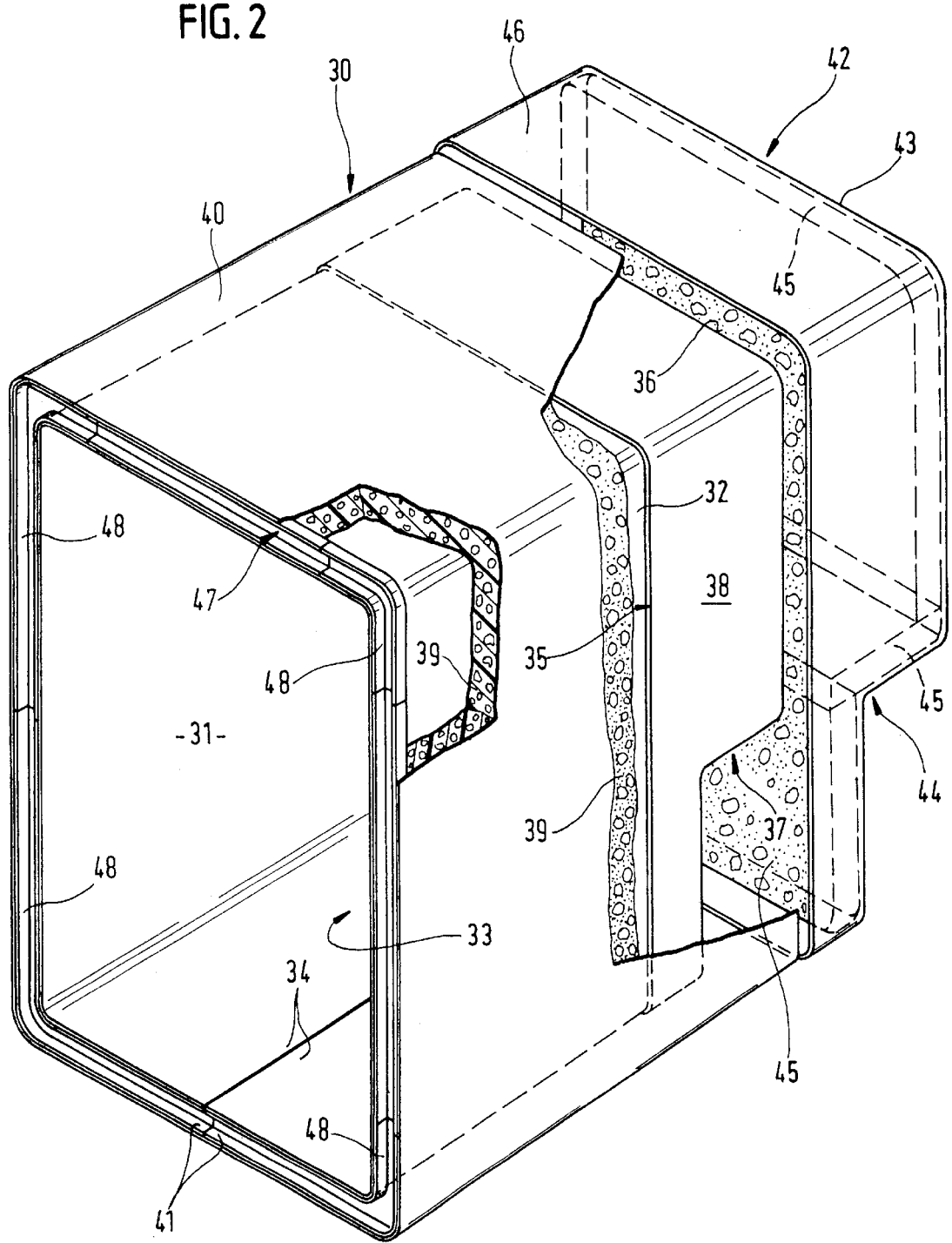

THERMALLY INSULATING HOUSING

BACKGROUND OF THE INVENTION

Field of the Invention

The invention relates to a thermally insulating housing with two housing shells that are arranged one inside the other, that are at least largely vacuum-tight, that are spaced apart from one another by a thermal insulation layer, and that are connected to one another in a vacuum-tight fashion. The housing bounds in a thermally insulating fashion a useful space which is accessible through a loading opening.

In household appliances whose thermally insulating housing is based on vacuum insulation technology, the prior art joins together the vacuum-tight boundary walls, which serve as top layers, in wall pieces that are usually produced from stainless steel plate. The individual pieces are typically welded to one another. In this known manufacturing technology, the boundary walls are produced using a plate construction method, the individual wall sections being produced as planar sheet-metal blanks and welded to one another.

Furthermore, in the context of housings for domestic refrigerating appliances which are thermally insulating and are based on vacuum insulation technology, it has been known to assemble the boundary walls of the housing, which walls serve as the inner and outer enclosures, from pre-shaped profile sections that connect a plurality of wall sections to one another in one piece. Here, in each case one section which is formed in a U or L shape is used for one of the boundary walls, the base, the top and one side wall being produced by the U section and the rear wall and a further side wall being produced by the L section. In order to manufacture the inner and outer enclosures, the two sections are either butt welded to one another or welded to one another along joining flanges which are specially provided for this purpose.

The two housing construction techniques have in common that cutting tools which are complex in terms of tool technology and are thus cost-intensive have to be used in order to be able to ensure that the individual elements which are necessary to manufacture the top walls are joined together and connected in a vacuum-tight fashion in the case of mass-produced housing structures. Nevertheless, in both construction techniques, in particular if the individual elements are butt connected to one another, it is not possible to entirely exclude the possibility of leaks occurring which adversely affect the vacuum insulation. In order to be able to avoid this problem with the construction concept comprising a U section and an L section, the procedure has been adopted of providing the sections with so-called joining flanges at their connecting joints. The sections are then welded to one another along the flanges. However, this results in a situation in which the joining flanges project into the insulation volume generated by evacuation, and not only impede the insertion of insulation material which supports the two containers with respect to one another but also adversely affect the thermal insulation capacity of the vacuum insulation by reducing the possible insulation width in their region. Furthermore, for the boundary walls which serve as inner and outer containers, such manufacturing techniques result in the problem that, owing to the abrupt junctions which result when the individual elements are joined together, the welding procedure cannot be carried out continuously over the corner region of the components to be connected.

SUMMARY OF THE INVENTION

It is accordingly an object of the invention to provide a thermally insulating housing, which overcomes the above-mentioned disadvantages of the heretofore-known devices and methods of this general type and which uses simple structural measures.

With the foregoing and other objects in view there is provided, in accordance with the invention, a thermally insulating housing, comprising:

an outer housing shell and an inner housing shell disposed inside the outer housing shell, the inner and outer housing shells being at least largely vacuum-tight, spaced apart from one another by a thermal insulation layer, and vacuum-tightly connected to one another;

the housing shells bounding, in a thermally insulating fashion, a useful space accessible through a loading opening defined by the housing shells;

each of the housing shells being a tubular element having a first opening vacuum-tightly closed off with a substantially vacuum-tight cover and a second opening and the tubular element of the inner housing shell being formed with a second opening defining the loading opening of the housing.

In other words, the object of the invention are satisfied by the production of the housing shells from a tubular element which is closed in a vacuum-tight fashion at one of its openings with a cover which is of at least very largely vacuum-tight design, while the remaining opening of the inserted tubular element serves as a loading opening of the housing.

By using tubular elements for constructing the housing shells, it is possible not only easily to produce various housing cross sections by using semifinished products, for example, but also to make a housing structure in which only the rear wall has to be positioned with respect to the tubular elements by using clamping and joining devices and welding it thereto. In this way, not only is the expenditure on tools reduced but also particularly the length of the welding seams is made smaller to the benefit of a significantly increased vacuum-tightness owing to the welding seam-less wall junctions of the tubular element. In addition, such a housing manufacturing technique makes cornered areas on the tubular element possible, as a result of which the welding procedure with the cover which serves as a rear wall of the housing shell can progress continuously. In addition, the use of tubular elements which are equipped with radii in their corner regions makes it possible to use a connection section whose section elements which have to be inserted into the corner region are produced in one piece, for example by shaping a planar sheet-metal blank.

In accordance with an added feature of the invention, the tubular elements have a rectangular (e.g. square) base surface, and the cover sealing the first opening is a shell cover.

The shell-like design of the cover which serves as a rear wall avoids an abrupt junction with the tubular element which would entail a certain degree of processing unreliability in terms of production technology, since when the shell walls are joined together with the walls of the tubular element the cover is positioned with sufficient accuracy with respect to the tubular element. As a result, the expenditure in terms of clamping and positioning is significantly reduced.

In accordance with an additional feature of the invention, the shell cover engages over free edges defined around the first opening of the tubular element and is vacuum-tightly secured to the tubular element.

This method of connection between the cover and the tubular element produces a so-called overlap joint which, owing to the wall thicknesses of the shell walls and of the tubular element walls one on top of the other makes it possible to connect the two components in a vacuum-tight fashion with a high processing speed, for example in the event that the tubular element and the covers are produced from stainless steel plate or steel plate with a corrosion-protected surface. The engagement of the shell walls over the free edges of the openings in the tubular element forcibly centers the rear wall with respect to the tubular element.

In accordance with an alternative feature of the invention, the shell cover is insertible into the first opening of the tubular element and is vacuum-tightly secured in the first opening.

As a result, a stepless surface on both tubular elements is easily produced, the stepless shape of the inserted tubular element significantly facilitating the process of filling the element with thermal insulation material, such as open-celled polyurethane foam or polystyrene foams, for example, while the stepless implementation of the external housing shell can serve without any postprocessing as a visible surface for the thermally insulating housing. If the shell edges are turned toward the free edges of the tubular element, the cover and the tubular element can particularly easily be connected to one another in a vacuum-tight fashion, for example by seam welding, if they are produced for example from a stainless steel plate or corrosion-protected steel plate.

In accordance with a further feature of the invention, the shell cover is formed with a stepped recess defining a machine space in the insulating housing. A shell cover is particularly suitable with regard to the machine space recess. The machine space which serves as a recess can be manufactured particularly expediently and particularly dimensionally rigidly in terms of production technology if the shell-like cover is produced by deep drawing a stainless steel plate or a corrosion-protected steel plate.

In accordance with again an added feature of the invention, the shell cover is formed by deep drawing a stainless steel plate or a corrosion-protected steel plate.

In accordance with again an additional feature of the invention, the tubular elements are formed by bending a stainless or corrosion-protected steel plate and by vacuum-tightly welding the free ends of the steel plate to one another.

Such a solution makes it possible to dimension the tubular elements differently from the standardized tubes, in particular in terms of the shaping in their corner regions. As a result, the procedure of welding a connection section, connecting the two tubular elements to one another in a vacuum-tight fashion on the loading side, to the tubular elements can be carried out continuously with high processing reliability and high processing speed.

With the above and other objects in view there is also provided, in accordance with the invention, a refrigeration appliance, which comprises a thermally insulating housing as described in the foregoing.

A thermally insulating housing of a refrigerating appliance can be manufactured in a particularly reliable way in terms of processing and yet cost-effectively with the thermal-insulating housing as claimed.

In addition, a housing of a refrigerating appliance which can be disposed of in a particularly environmentally friendly way with a high thermal insulation capacity is produced.

A thermally insulating cooker muffle of a household oven can be manufactured in an equally particularly reliable way in terms of processing, robustly and with a high processing speed. Such an oven muffle can not only be disposed of in a particularly environmentally friendly way but is also thermally insulating to a high degree.

Other features which are considered as characteristic for the invention are set forth in the appended claims.

Although the invention is illustrated and described herein as embodied in a thermally insulating housing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a partly broken away perspective view of a second embodiment variant of a refrigerating appliance housing whose tubular elements positioned one inside the other are closed off at their rear side with a cover affording a recess for a machine space.

DESCRIPTION OF THE PREFERRED EMBODIMENTS

Figure 1:
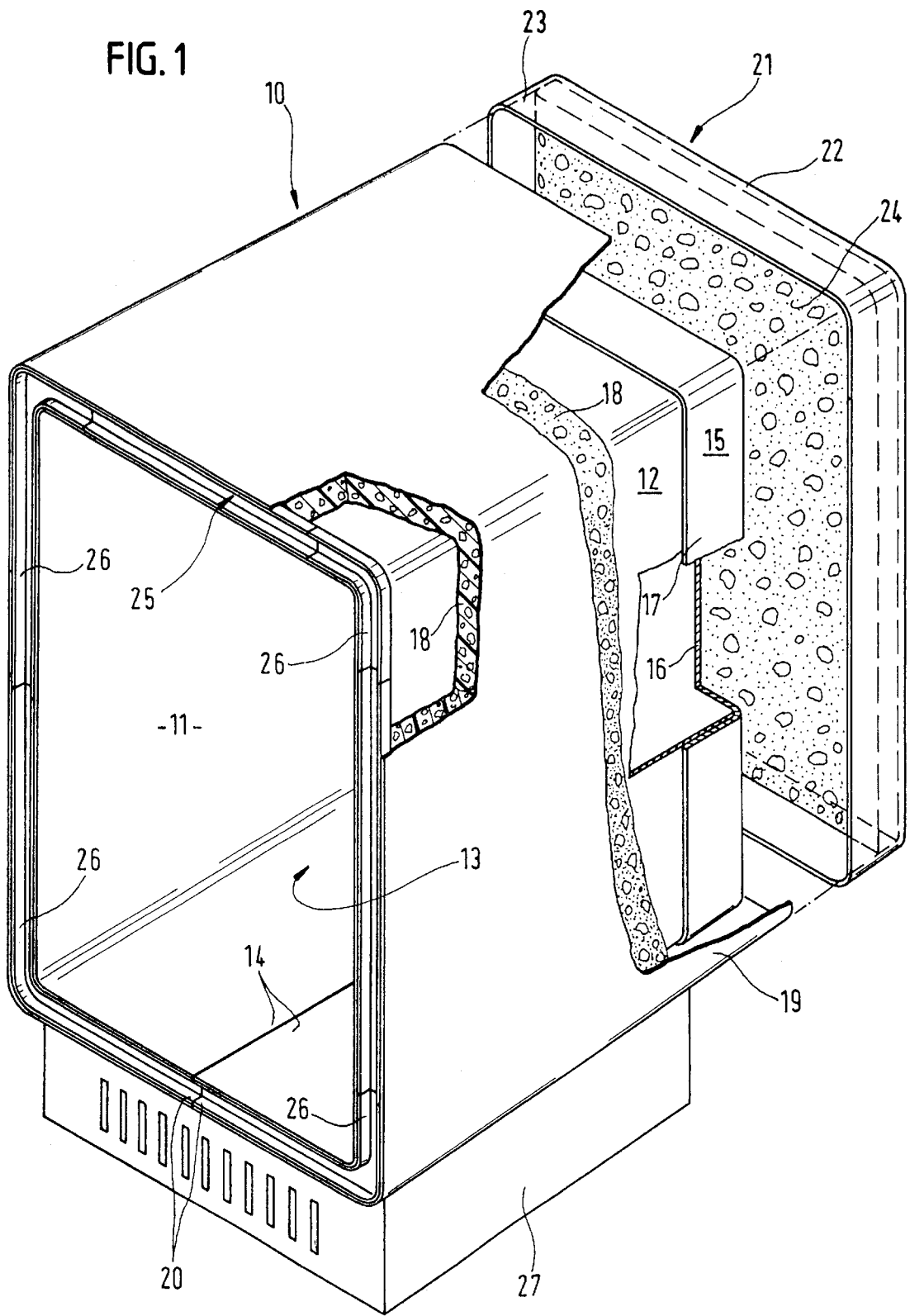
FIG. 1 is a partly broken away perspective view of a first embodiment of a refrigerating appliance housing with an assembly base and two tubular elements positioned one inside the other and closed off in each case at one of their openings by a cover serving as a rear wall.

Referring now to the figures of the drawing in detail and first, particularly, to FIG. 1 thereof, there is seen a first embodiment of a thermally insulating housing 10 which can be used for a domestic refrigerating appliance, such as a household refrigerator or freezer. Its useful space 11 is a refrigerating or freezing space lined by an inner housing shell 12. The inner shell 12 is a tubular element 12. The latter bounds the opening cross section of an access opening 13 which serves for loading the useful space 11 and is produced by repeatedly bending, for example, a stainless steel plate or a corrosion-protected steel plate whose ends 14 which face one another through the bending are connected to one another in a vacuum-tight fashion by means of microplasma welding or electron beam welding or the like. The inner tubular element 12 which is provided with a rectangular cross section is provided at its end side lying opposite the loading opening 13 with a cover 15 which is manufactured from corrosion-protected steel sheet or a stainless steel plate, for example using the deep drawing method, is designed in the manner of a flat shell and whose shell bottom 16 forms the rear wall of the useful space 11, while its shell wall 17 which is designed to run around in one piece engages over the end section, lying opposite the loading opening 13, of the inner tubular element 12. The engagement of the shell wall 17 over the end section produces an overlap joint between the tubular element 12 and the cover 15, along which joint the cover 15 is connected in a vacuum-tight fashion to the tubular element 12 by means of laser welding, for example. The tubular element 12 is surrounded at its outer side facing away from the useful space 11 by a thermal insulation layer 18 which is in plate form, is produced, for example, from open-celled polyurethane foam or open-celled polystyrene foam and which takes up at least essentially the entire outer surface of the inner tubular element 12. On its outer side against which the tubular element 12 bears, the thermal insulation layer 18 is surrounded by an outer tubular element 19 which thus also surrounds the inner tubular element 12 and which, like the latter, is produced by repeatedly bending a stainless steel plate or a corrosion-protected steel plate whose free ends 20 which face one another as a result of the bending are connected to one another in a vacuum-tight fashion by, for example, electron beam welding or microplasma welding or the like. At its end lying opposite the loading opening 13 and projecting forward with respect to the cover 15, the outer tubular element 19 is provided, like the tubular element 12, with a shell-like cover 21 (shown in the removed state), the shell bottom 22 of which cover 21 forms the rear wall of the housing and the shell wall 23 of which extends all the way through in the manner of a closed wall and engages, in the assembled state, over the end section, facing it, of the outer tubular element 19, so that a so-called overlap joint is also formed between the cover 21 and the outer tubular element 19, along which overlap joint the cover 21 is secured to the outer tubular element 19 in a vacuum-tight fashion. The cover 21 serves at the same time as a receptacle for a thermal insulation element 24 which is provided in a platform and which is produced, for example, from open-celled polyurethane foam or open-celled polystyrene foam. The thermal insulation element 24 is pressed along its contour in the assembled state of the cover 21 against the free edges of the thermal insulation layer 18 and is recessed with respect to the shell wall 23 in order to be able to insert the end section, lying opposite the loading opening 13, of the outer tubular element 19 into the cover 21 which is of shell-like design. On the loading opening 13 opposite the cover 21, the outer tubular element 19 is connected in a vacuum-tight fashion to the inner tubular element 12 by means of a connection section 25 which has a U-shaped cross section and is secured in a vacuum-tight fashion by welding to the tubular elements 12 and 19 by its U-section limbs facing said elements. The connection section 25 is composed of a plurality of individual elements which are connected to one another in a vacuum-tight fashion, the individual elements 26 which are arranged in the corner region of the thermally insulating housing 10 extending continuously without joints over the corner region of the tubular elements 12 and 19, which are inserted one into the other. In the state in which they are inserted one into the other, the tubular elements 12 and 19 bound, together with their covers 15 and 21 provided on the rear and the connection section 25 arranged on the front, an intermediate space which can be evacuated and which is filled with thermal insulation material 18 and 25 which serves to support the tubular elements 12 and 19 in the evacuated state. Of the two tubular elements 12 and 19, a receptacle housing 27 for holding refrigeration assemblies (not described in more detail) is secured to the underside of the outer tubular element 19, said housing 27 being equipped on its side facing the loading opening 13 with a housing wall having ventilation slits.

Referring now to FIG. 2, there is shown a thermally insulating housing 30 which is of similar design as the housing 10 illustrated in FIG. 1 and, like the latter, has a useful space 31 whose enclosure is formed by an inner tubular element 32 which is provided with a rectangular cross section and which bounds, by virtue of its dimensions, a loading opening 33 which serves for loading and unloading the useful space 31 with material for storage. The inner tubular element 32 is produced by repeatedly bending a, for example, 0.4 mm thick stainless steel plate or corrosion-protected steel plate whose free ends 34 which are turned toward one another by the bending are connected to one another in a vacuum-tight fashion by means of a suitable weld. Suitable welding methods are microplasma welding and electron beam welding. The inner tubular element 32 is provided at its end lying opposite the loading opening 33 with a cover 35 which is of shell-like design and whose shell bottom 36 is designed as a rear wall of the useful space 31 and has a step-like recess 37 which runs over the width of the shell bottom 36. The shell bottom 36 is bounded by a continuous shell wall 38 which is arranged all around along its edges and which engages over the end section of the tubular element 32 lying opposite the loading opening 33, and, in the installed state of the cover 35, forms an overlap joint with the tubular element 32 along which the cover which is produced by deep drawing a stainless steel plate to form a corrosion-protected steel plate is secured to the tubular element 32 by welding. On its outer side facing away from the useful space 31, the tubular element 32 is surrounded on all sides by a thermal insulation layer 39 which is manufactured from plate-shaped, open-celled polystyrene foam or open-celled polyurethane foam and takes up at least approximately the entire length of the inner tubular element 32. The thermal insulation layer 39 is itself surrounded by an outer tubular element 40 which is designed as a housing shell and which is formed, in a way analogous to the tubular element 32, by repeatedly bending a corrosion-protected steel plate or a stainless steel plate with walls 0.4 mm thick in each case, the ends 41 of which plate which face one another as a result of the bending being welded to one another in a vacuum-tight fashion. The outer tubular element 40 is provided at its rear side lying opposite the loading opening 32 with a shell-like cover 42 which is illustrated in the removed state and whose shell bottom 43 forms the rear wall of the housing 30 and has a step-like recess 44 which serves as machine space for holding refrigeration assemblies (not described in more detail). The shell bottom 43 is configured with a thermal insulation layer 45 which is produced, for example, from open-celled polyurethane or open-celled polystyrene foam panels. In addition, the shell bottom 43 is provided at its edges with a shell wall 46 which laterally secures the thermal insulation panels and runs around along the contour of the shell bottom 43. The shell wall 46 engages, in the installed state of the cover 42, over the end section, facing it, of the tubular element 40, and in the installed state forms, together with the latter, an overlap joint along which the cover 42, which is produced for example by deep drawing a stainless steel plate or corrosion-protected steel plate, is welded to the tubular element 40 in a vacuum-tight fashion. Opposite the cover 42, the free ends, facing the loading opening 33, of the tubular elements 32 and 40, inserted one into the other, are connected in a vacuum-tight fashion to a connection section which is of U-shaped cross section and whose U-section limb points toward the free edges of the tubular elements 32 and 40. The connection section 47 is composed of a plurality of section elements which run along the contour of the tubular element cross sections, are connected to one another in a vacuum-tight fashion and of which the section elements 48 provided in the corner regions of the tubular elements 32 and 40 are designed so as to extend continuously in one piece over the corner region. The connection section 47 on the loading side of the thermally insulating housing 32 and the shell-like cover 42 which is secured to the outer tubular element 40 in a vacuum-tight fashion produce, on the rear side of the housing 30, an intermediate space which can be evacuated and which is created between the inner tubular element 32 with its cover 35 and the outer tubular element 40 with its cover 42. The intermediate space in the shell region of the tubular elements 32 and 40 is filled with the thermal insulation layer 39 and, in the region of the rear wall of the housing, with the thermal insulation layer 45, the tubular elements 32 and 40 which serve as housing shells being supported on one another by their covers 35 and 42 in the evacuated state of the intermediate space by virtue of the two thermal insulation layers 39 and 45.

The housing design which is described by way of example for refrigerating appliance housings can also be applied to domestic oven cookers with their structural modifications specific to cookers. It is understood that the thermal insulation must be adapted to the temperatures which are specific to the operation of cookers.

It would also be conceivable to change over from plate-like material such as steel plate or tubular elements shaped in such a way with a circular cross section by nonmaterial-removing shaping procedures to tubular elements with a rectangular cross section.

We claim:

1. A thermally insulating housing, comprising:
   a substantially vacuum-tight tubular outer housing shell having an outer opening;
   a substantially vacuum-tight outer cover vacuum-tightly closing off said outer opening;
   a substantially vacuum-tight tubular inner housing shell having an inner opening and a loading opening;
   a substantially vacuum-tight inner cover vacuum-tightly closing off said inner opening; and
   a thermal insulation layer;
   said inner housing shell disposed inside said outer housing shell and substantially vacuum-tightly connected to said outer housing shell;
   said thermal insulation layer disposed between said inner housing shell and said outer housing shell; and
   said inner housing shell and said outer housing shell bounding, in a thermally insulating fashion, a useful space accessible through said loading opening.

2. The thermally insulating housing according to claim 1, wherein said outer housing shell and said inner housing shell each have a rectangular base surface, said inner cover is formed as an inner shell cover and said outer cover is formed as an outer shell cover.

3. The thermally insulating housing according to claim 2, wherein said inner opening defines an inner housing free edge and said inner shell cover substantially vacuum-tightly engages over said inner housing free edge, and said outer opening defines an outer housing free edge and said outer shell cover substantially vacuum-tightly engages over said outer housing free edge.

4. The thermally insulating housing according to claim 2, wherein said inner shell cover has a stepped recess.

5. The thermally insulating housing according to claim 2, wherein said inner shell cover is a stainless steel plate formed by deep drawing.

6. The thermally insulating housing according to claim 2, wherein said inner shell cover is a corrosion-protected steel plate formed by deep drawing.

7. The thermally insulating housing according to claim 2, wherein said outer shell cover has a stepped recess.

8. The thermally insulating housing according to claim 2, wherein said outer shell cover is a stainless steel plate formed by deep drawing.

9. The thermally insulating housing according to claim 2, wherein said outer shell cover is a corrosion-protected steel plate formed by deep drawing.

10. The thermally insulating housing according to claim 1, wherein said outer housing shell and said inner housing shell each have a square base surface.

11. The thermally insulating housing according to claim 1, wherein said inner housing shell and said outer housing shell are each formed by bending a steel plate with free ends and by vacuum-tightly welding said free ends of said steel plate to one another.

12. The thermally insulating housing according to claim 11, wherein said steel plate is a stainless steel plate.

13. The thermally insulating housing according to claim 11, wherein said steel plate is a corrosion-protected steel plate.

14. A refrigeration appliance, comprising a thermally insulating housing having:
   a substantially vacuum-tight tubular outer housing shell having an outer opening;
   a substantially vacuum-tight outer cover vacuum-tightly closing off said outer opening;
   a substantially vacuum-tight tubular inner housing shell having an inner opening and a loading opening;
   a substantially vacuum-tight inner cover vacuum-tightly closing off said inner opening; and
   a thermal insulation layer;
   said inner housing shell disposed inside said outer housing shell and substantially vacuum-tightly connected to said outer housing shell;
   said thermal insulation layer disposed between said inner housing shell and said outer housing shell; and
   said inner housing shell and said outer housing shell bounding, in a thermally insulating fashion. a useful space accessible through said loading opening.

15. A household oven, comprising a thermally insulating cooker muffle formed of a thermally insulating housing having:
   a substantially vacuum-tight tubular outer housing shell having an outer opening;
   a substantially vacuum-tight outer cover vacuum-tightly closing off said outer opening;
   a substantially vacuum-tight tubular inner housing shell having an inner opening and a loading opening;
   a substantially vacuum-tight inner cover vacuum-tightly closing off said inner opening; and
   a thermal insulation layer;
   said inner housing shell disposed inside said outer housing shell and substantially vacuum-tightly connected to said outer housing shell;
   said thermal insulation layer disposed between said inner housing shell and said outer housing shell; and
   said inner housing shell and said outer housing shell bounding, in a thermally insulating fashion, a useful space accessible through said loading opening.

* * * * *